United States Patent
Carpenter

(10) Patent No.: US 11,560,134 B2
(45) Date of Patent: Jan. 24, 2023

(54) DEFAULT CHARGING OF AUTOMOTIVE BATTERY WHILE PARKED

(71) Applicant: Ford Global Technologies, LLC, Dearborn, MI (US)

(72) Inventor: Toussaint Carpenter, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 243 days.

(21) Appl. No.: 16/983,611

(22) Filed: Aug. 3, 2020

(65) Prior Publication Data

US 2022/0032900 A1    Feb. 3, 2022

(51) Int. Cl.
| | |
|---|---|
| *B60W 20/13* | (2016.01) |
| *B60W 10/26* | (2006.01) |
| *B60W 10/06* | (2006.01) |
| *B60L 53/00* | (2019.01) |

(52) U.S. Cl.
CPC .......... *B60W 20/13* (2016.01); *B60L 53/00* (2019.02); *B60W 10/06* (2013.01); *B60W 10/26* (2013.01)

(58) Field of Classification Search
CPC ...... B60W 20/13; B60W 10/06; B60W 10/26; B60L 53/00; B60L 53/63; B60L 53/64; B60L 2250/14; B60L 2260/58; B60L 53/60; B60L 53/66
USPC ......................................................... 701/22
See application file for complete search history.

(56) References Cited

U.S. PATENT DOCUMENTS

| | | |
|---|---|---|
| 2012/0034507 A1 | 2/2012 | Harada et al. |
| 2017/0093211 A1 | 3/2017 | Nakagawa et al. |
| 2021/0126471 A1* | 4/2021 | Srivastava ........... H02J 7/00711 |

FOREIGN PATENT DOCUMENTS

| | | | |
|---|---|---|---|
| JP | 2002236530 A | 8/2002 | |
| WO | WO-2013132531 A1 * | 9/2013 | ............ B60W 10/06 |

* cited by examiner

*Primary Examiner* — Yi-Kai Wang
(74) *Attorney, Agent, or Firm* — David B. Kelly; Brooks Kushman P.C.

(57) ABSTRACT

A vehicle control system may, during a deactivated state of the vehicle, generate a wake up signal, and responsive to a current or voltage associated with the wake up signal being outside a predetermined range, activate an ignition relay of the vehicle for a predefined period of time. The vehicle control system may further, responsive to a request to activate the vehicle, activate the ignition relay.

15 Claims, 2 Drawing Sheets

DEFAULT CHARGING OF AUTOMOTIVE BATTERY WHILE PARKED

TECHNICAL FIELD

This disclosure relates to the strategies for charging an automotive vehicle.

BACKGROUND

Certain vehicles, among other things, may include a traction battery and one or more electric motors for propulsion. The traction battery is the source of power for the one or more electric motors. These vehicles may provide a user the ability to schedule charging of the traction battery provided they are plugged in or suitably arranged with a wireless charging system. A user, for example, may plug in their vehicle after returning home in the evening and set a charge time for the traction battery to begin at 2 AM.

SUMMARY

A vehicle includes an ignition relay and a controller. The controller, responsive to a request to activate the vehicle, activates the ignition relay, during a deactivated state of the vehicle, generates a wake up signal, and responsive to a current or voltage associated with the wake up signal being outside a predetermined range, activates the ignition relay for a predefined period of time.

A method for controlling operation of a vehicle includes, responsive to a request to activate the vehicle, activating an ignition relay. The method further includes, during a deactivated state of the vehicle, generating a wake up signal, and responsive to a current or voltage associated with the wake up signal being outside a predetermined range, activating the ignition relay for a predefined period of time.

A vehicle control system includes a controller that, during a deactivated state of the vehicle, generates a wake up signal, and responsive to a current or voltage associated with the wake up signal being outside a predetermined range, activates an ignition relay of the vehicle for a predefined period of time.

DETAILED DESCRIPTION

Figure 1:
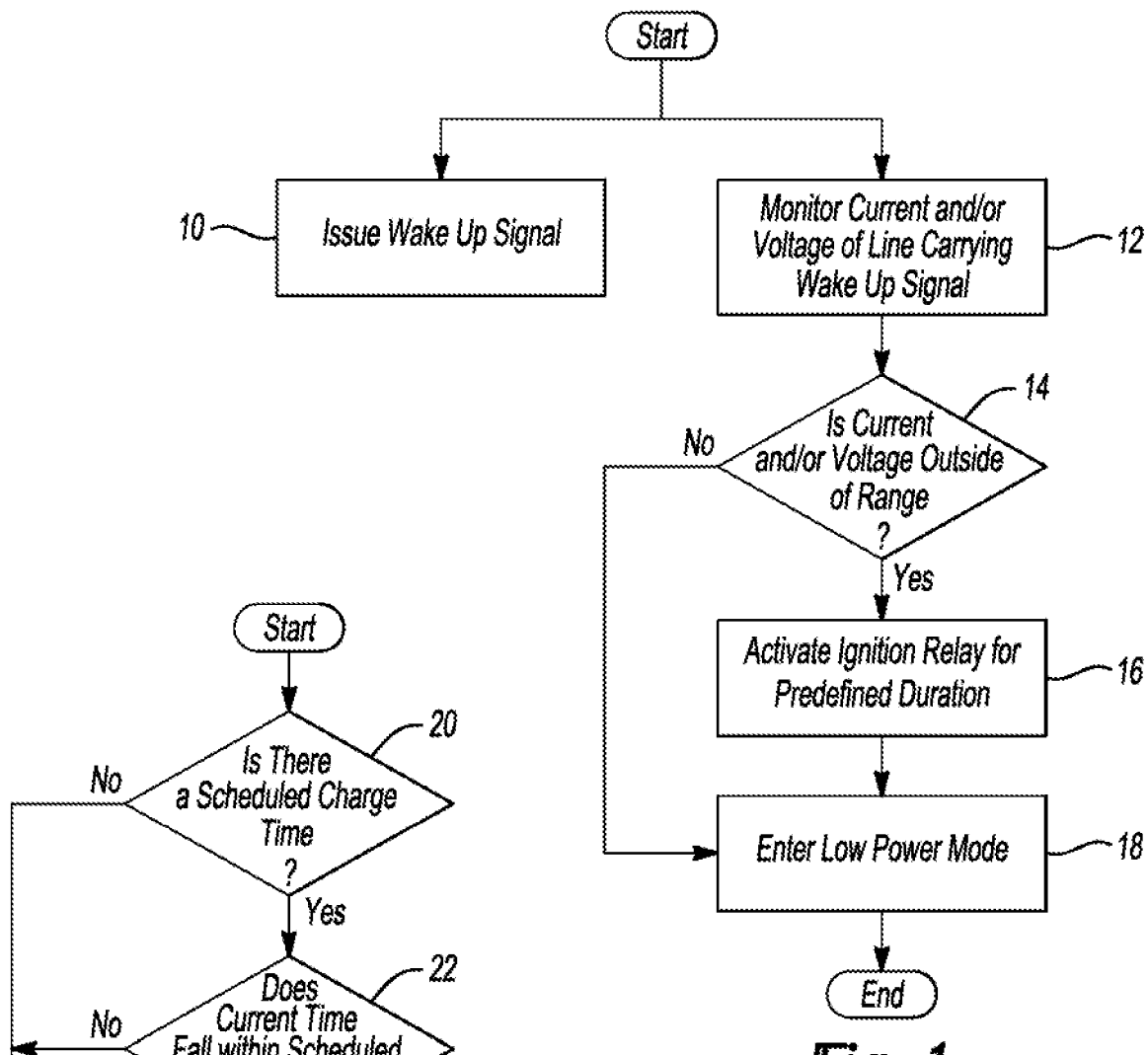
FIG. 1 is a flow chart of an algorithm for controller operation during vehicle deactivation.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Chargeable vehicles (e.g., plug-in electric vehicles, hybrid plug-in electric vehicles, electric vehicles with wireless charging capabilities, etc.) may include a variety of controllers that perform different tasks. Examples of such controllers include body control modules, brake control modules, central timing modules, general electronic modules, hybrid powertrain control modules, and suspension control modules. Their names are sometimes indicative of their functionality.

Among other things, a body control module may initiate activation of an ignition relay or run-start relay when a vehicle is first activated (e.g., at key on) so that power can be supplied to any ignition system, fuel system, and/or other systems of the vehicle needed to run the vehicle. For example, activation of the ignition relay also activates other controllers, such as a hybrid powertrain controller, by permitting activation power to flow to them as known in the art.

When a vehicle is deactivated (in a key off state), its controllers typically enter a low power mode (sleep mode). One or more of the controllers, however, may be programmed to periodically become active and wake up other of the controllers to perform certain tasks during key off. These controllers may remain active for a certain period of time before returning to their low power mode. These wake up procedures, however, do not include activation of the ignition relay as known in the art.

A body control module, for example, may be programmed to periodically become active during key off and issue wake up signals via a Controller Area Network (CAN) or otherwise to a hybrid powertrain control module. Once active, the hybrid powertrain control module may be tasked with initiating any scheduled traction battery charge events that are to take place at that time. If, for example, a user has scheduled a traction battery charge event to take place between 2 AM and 5 AM, and the hybrid powertrain control module becomes active (is woken up) at 12 AM, it will inhibit steps to initiate charging of the traction battery. If the hybrid powertrain control module becomes active at 2:05 AM, it will take steps to initiate charging of the traction battery according to the schedule.

Faults may occur that prevent communication between controllers during key off. Continuing with the example above, if such a fault prevents the body control module's wake up communication from reaching the hybrid powertrain control module, the hybrid powertrain control module may not become active during key off as normally expected, and may be unable to initiate any traction battery charge event scheduled to take place during key off.

Controller diagnostics may be performed when a vehicle is first activated (at key on). Such activation results in its controllers becoming active. One diagnostic may include the body control module issuing a wake up signal, and other controllers waiting to detect such wake up signal. If, for example, the hybrid powertrain control module does not detect the wake up signal from the body control module within a predefined duration (e.g., 30 seconds, 45 seconds, etc.) of the vehicle being first activated, the hybrid powertrain control module may set a diagnostic flag.

Controller diagnostics may also be performed during key off. One diagnostic may again include the body control module issuing a wake up signal during its wake up period, and monitoring the current and/or voltage on the communication line carrying the wake up signal during the issuing to ensure they fall within predetermined ranges (e.g., 10 to 20 mA and/or 4 to 6 V). The current and/or voltage falling outside the respective predetermined ranges during the issuing may be indicative of a communication fault between the body control module and other controllers, such as the hybrid powertrain control module. Responsive to this condition, the body controller may be configured to activate the ignition relay for a predetermined duration (e.g., 5 seconds, 8 seconds)—even though the vehicle is not in key on-so that activation power may flow to other controllers, including the hybrid powertrain controller. This activation power will prompt the hybrid powertrain controller to become active even though it may not be able to receive wake up signals from the body controller. Once the body controller deactivates the ignition relay upon expiration of the predetermine duration, the various controllers powered thereby will detect using known techniques that the vehicle is in key off, and thus enter sleep mode according to their low power mode programming. Because the controllers can periodically become active during key off even though they may not be able to receive wake up signals, they can perform their key off functions. If, for example, a charge event is scheduled to take place between 4 AM and 7 AM and the hybrid powertrain controller becomes active during this time period via the techniques just described, it can initiate the charge event.

With reference to FIG. 1, a controller, e.g., a body controller, issues a wake up signal, upon waking up during key off, for other controllers at operation 10 and monitors via sensors (e.g., current sensors, voltage sensors, etc.) whether the current and/or voltage on the communication line carrying the wake up signal is within range at operation 12. Such a wake up signal, for example, may be broadcast on any accessible communication network (e.g., CAN, Ethernet, etc.). At operation 14, the controller determines whether the current and/or voltage are outside of predetermine ranges. If yes, the controller activates the ignition relay for a predefined duration at operation 16. The controller then enters low power mode at operation 18 upon completion of its designated functions. The algorithm then ends.

Figure 2:
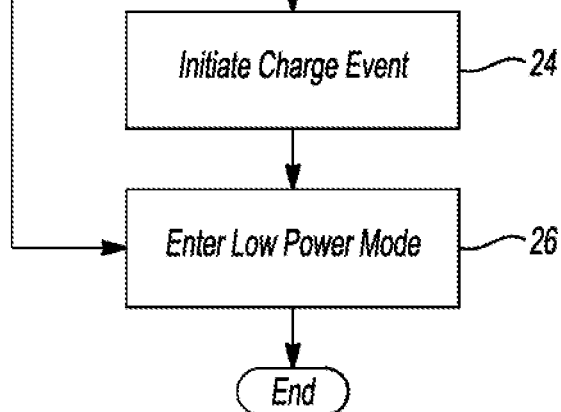
FIG. 2 is a flow chart of an algorithm for charging a battery of a vehicle.

With reference to FIG. 2, a controller, e.g., a hybrid powertrain controller, determines whether a charge time has been scheduled at operation 20. If yes, the controller determines whether the current time falls within the scheduled charge time at operation 22. If yes, the controller initiates the charging at operation 24. The controller, at operation 26, then enters low power mode. The algorithm them ends. Returning to each of operations 20 and 22, if no, the algorithm then proceeds to operation 26.

Figure 3:
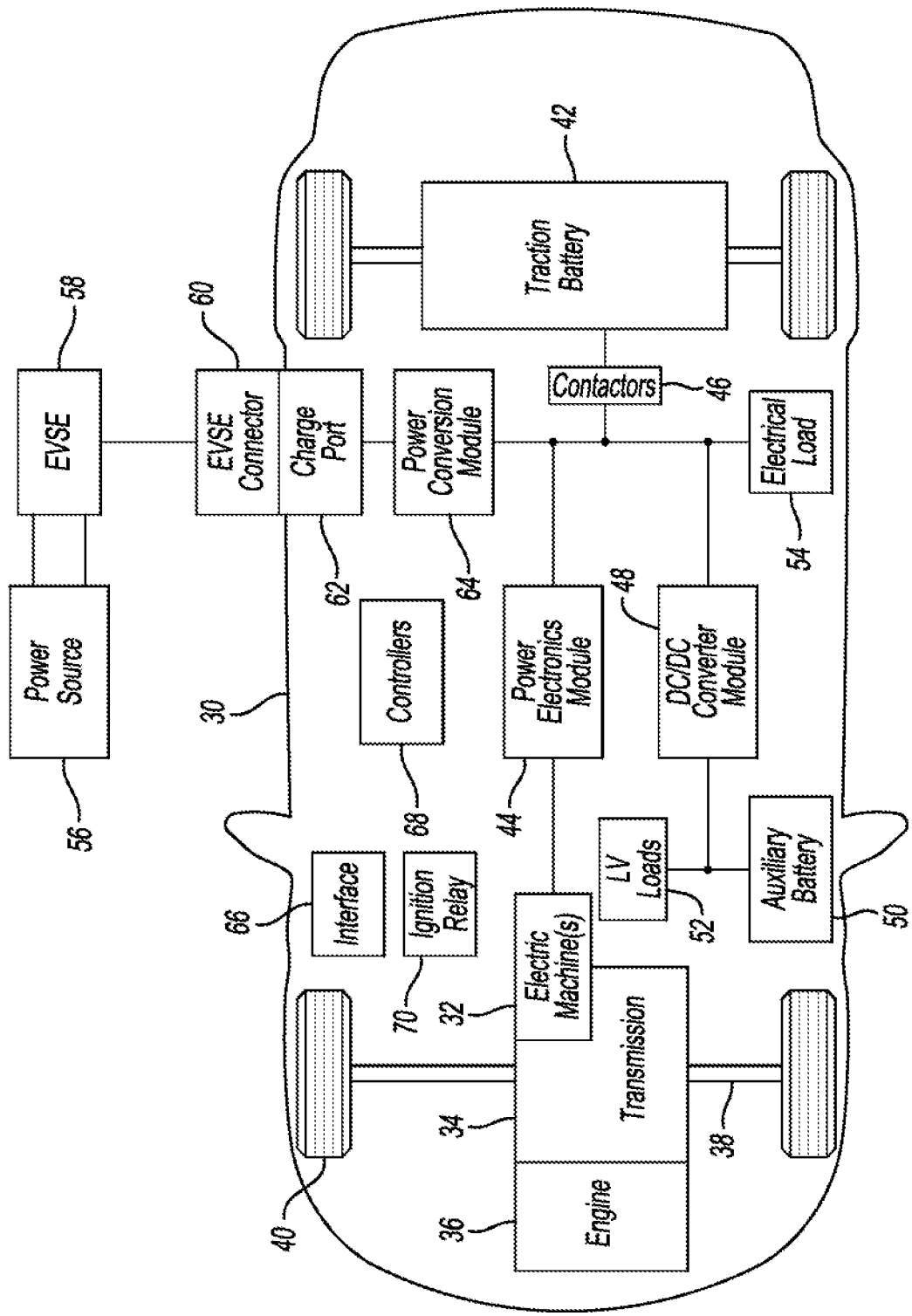
FIG. 3 is a schematic diagram of a vehicle.

With reference to FIG. 3, an electrified vehicle 30 (e.g., a plug-in hybrid-electric vehicle) includes one or more electric machines 32 mechanically coupled to a hybrid transmission 34. The electric machines 32 may operate as a motor or generator. In addition, the hybrid transmission 34 is mechanically coupled to an engine 36 and drive shaft 38. The drive shaft 38 is mechanically coupled to wheels 40. The electric machines 32 can provide propulsion and slowing capability when the engine 36 is turned on or off. The electric machines 32 may also act as generators and can provide fuel economy benefits by recovering energy that would normally be lost as heat in a friction braking system. The electric machines 32 may also reduce vehicle emissions by allowing the engine 36 to operate at more efficient speeds and allowing the electrified vehicle 30 to be operated in electric mode with the engine 36 off under certain conditions. The electrified vehicle 30 may also be a battery electric vehicle. In such a configuration, the engine 36 may not be present. Other arrangements are also contemplated.

A traction battery or battery pack 42 stores energy that can be used by the electric machines 32. The vehicle battery pack 42 may provide a high voltage direct current (DC) output. The traction battery 42 may be electrically coupled to one or more power electronics modules 44. One or more contactors 46 may isolate the traction battery 42 from other components when opened and connect the traction battery 42 to other components when closed. The power electronics module 44 is also electrically coupled to the electric machines 32 and provides the ability to bi-directionally transfer energy between the traction battery 42 and the electric machines 32. For example, the traction battery 42 may provide a DC voltage while the electric machines 32 may operate with a three-phase alternating current (AC). The power electronics module 44 may convert the DC voltage to a three-phase AC current to operate the electric machines 32. In a regenerative mode, the power electronics module 44 may convert the three-phase AC current from the electric machines 32 acting as generators to the DC voltage compatible with the traction battery 42.

In addition to providing energy for propulsion, the traction battery 42 may provide energy for other vehicle electrical systems. The electrified vehicle 30 may include a DC/DC converter module 48 that converts the high voltage DC output of the traction battery 42 to a low voltage DC supply that is compatible with low-voltage vehicle loads. An output of the DC/DC converter module 48 may be electrically coupled to an auxiliary battery 50 (e.g., 12V battery) for charging the auxiliary battery 50. Low-voltage systems 52 may be electrically coupled to the auxiliary battery 50. One or more electrical loads 54 may be coupled to the high-voltage bus. The electrical loads 54 may have an associated controller that operates and controls the electrical loads 54 when appropriate. Examples of the electrical loads 54 include a fan, electric heating element, and air-conditioning compressor.

The electrified vehicle 30 may be configured to recharge the traction battery 42 from an external power source 56. The external power source 56 may be a connection to an electrical outlet, an electrical power distribution network, or a grid as provided by an electric utility company. The external power source 56 may be electrically coupled to a charger or electric vehicle supply equipment (EVSE) 58. The EVSE 58 may provide circuitry and controls to regulate and manage the transfer of energy between the power source 56 and electrified vehicle 30. The external power source 56 may provide DC or AC electric power to the EVSE 58. The EVSE 58 may have a charge connector 60 for plugging into a charge port 62 of the electrified vehicle 30. The charge port 62 may be any type of port configured to transfer power from the EVSE 60 to the electrified vehicle 30. The charge port 62 may be electrically coupled to a charger or on-board power conversion module 64. The power conversion module 64 may condition the power supplied from the EVSE 58 to provide the proper voltage and current levels to the traction battery 42. The power conversion module 64 may interface with the EVSE 58 to coordinate the delivery of power to the electrified vehicle 30. The EVSE connector 60 may have pins that mate with corresponding recesses of the charge port 62. Alternatively, various components described as being electrically coupled or connected may transfer power using wireless inductive coupling.

Controllers/interfaces/modules in the electrified vehicle 30 may communicate via one or more vehicle networks. The vehicle network may include a plurality of channels for communication. One channel of the vehicle network may be a serial bus such as a CAN. One of the channels of the vehicle network may include an Ethernet network defined by the Institute of Electrical and Electronics Engineers 802 family of standards. Additional channels of the vehicle network may include discrete connections between modules and may include power signals from the auxiliary battery 50. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 3 but the vehicle network may connect to any electronic module that is present in the electrified vehicle 30.

The electrified vehicle 30 may include an interface 66 (e.g., touch screen, cellular transceiver, etc.) configured to receive user input defining a desired plug-in charge time, and a plurality of controllers 68 (e.g., a body controller, brake controller, central timing controller, hybrid powertrain controller, suspension controller, etc.). One or more of these controllers 68 may perform the algorithms contemplated herein. The electrified vehicle 30 may further include an ignition relay 70 in communication with at least one of the controllers 68 and configured to, when activated, permit activation power to flow to other of the controllers 68 and other subsystems of the electrified vehicle 30.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. Although examples herein were described with reference to a body control module and hybrid powertrain control module, the strategies contemplated herein may of course be applied to any set of controllers tasked with waking up during key off and initiating scheduled battery charge activities. While recognizing that the phase ignition relay may be more appropriate for vehicles that have fuel systems and the phrase run-start relay may be more appropriate for vehicles that do not have fuel systems, these phrases can be used interchangeably herein for purposes of understanding the proposed embodiments and interpreting the claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an ignition relay; and
a controller programmed to,
responsive to a request to activate the vehicle, activate the ignition relay, and
during a deactivated state of the vehicle, generate a wake up signal, and responsive to a current or voltage associated with the wake up signal being outside a predetermined range, activate the ignition relay for a predefined period of time less than 10 seconds.

2. The vehicle of claim 1 further comprising a traction battery and another controller programmed to, responsive to presence of a request designating a window of time for a charge event of the traction battery and a current time falling within the window, initiate the charge event.

3. The vehicle of claim 2, wherein the another controller is a hybrid powertrain controller.

4. The vehicle of claim 2 further comprising an interface configured to receive the request designating a window of time for a charge event of the traction battery.

5. The vehicle of claim 1, wherein the controller is a body controller.

6. A method for controlling operation of a vehicle, comprising:
by one or more controllers,
responsive to a request to activate the vehicle, activating an ignition relay, and
during a deactivated state of the vehicle,
generating a wake up signal, and
responsive to a current or voltage associated with the wake up signal being outside a predetermined range, activating the ignition relay for a predefined period of time less than 10 seconds.

7. The method of claim 6 further comprising, by the one or more controllers, responsive to presence of a request designating a window of time for a charge event of a traction battery and a current time falling within the window, initiating the charge event.

8. The method of claim 7 further comprising receiving the request designating a future start time for a charge event of the traction battery.

9. The method of claim 7, wherein the one or more controllers include a hybrid powertrain controller.

10. The method of claim 6, wherein the one or more controllers include a body controller.

11. A vehicle control system comprising:
a controller programmed to, during a deactivated state of the vehicle, generate a wake up signal, and responsive to a current or voltage associated with the wake up signal being outside a predetermined range, activate an ignition relay of the vehicle for a predefined period of time less than 10 seconds.

12. The vehicle control system of claim 11, wherein the controller is further programmed to responsive to a request to activate the vehicle, activate the ignition relay.

13. The vehicle control system of claim 11 further comprising another controller programmed to, responsive to presence of a request designating a window of time for a charge event of a traction battery and a current time falling within the window, initiate the charge event.

14. The vehicle control system of claim 13, wherein the another controller is a hybrid powertrain controller.

15. The vehicle control system of claim 11, wherein the controller is a body controller.

* * * * *